Patented June 20, 1944

2,351,721

UNITED STATES PATENT OFFICE 2,351,721

PROCESS FOR PREPARING d-RIBOSE-2-NITRO-4,5-DIMETHYLANILIDE

Alexander R. Surrey, Albany, N. Y., assignor to Winthrop Chemical Company, Inc., New York, N. Y., a corporation of New York No Drawing. Application June 22, 1943, Serial No. 491,784

7 Claims. (Cl. 260—211)

This invention relates to an improved process for the preparation of d-ribose-2-nitro-4,5-dimethylanilide, which is valuable as an intermediate for the preparation of riboflavin.

In the past d-ribose-2-nitro-4,5-dimethylanilide has been prepared by heating ribose with a large excess of 2-nitro-4,5-dimethylaniline in absolute alcohol, in the presence of an acid catalyst such as ammonium chloride. The product prepared according to this procedure is difficult to isolate and purify, and indeed in order to secure a pure product it has been necessary in the past to subject the crude product to chromatographic absorption with subsequent preferential elution. Such a procedure however is long and tedious and requires the evaporation of large amounts of solvents.

Because of the difficulty of isolating d-ribose-2-nitro-4,5-dimethylanilide as prepared by the above procedure, it has been necessary in the past to facilitate matters as much as possible by using only the purest of chemicals. This has required that pure crystalline d-ribose be employed. Crystalline d-ribose, however, is relatively much more expensive than the somewhat impure crude ribose sirups from which it is prepared, and hence the prior procedure has been more expensive than would be the case if crude d-ribose could be used.

I have discovered that the foregoing and other difficulties and disadvantages of previous practice can be overcome by adhering to the procedure constituting my present invention. Furthermore, I have discovered that the reaction of d-ribose with 2-nitro-4,5-dimethylaniline to form d-ribose-2-nitro-4,5-dimethylanilide can uniquely be unexpectedly well carried out in an alcohol-benzene solvent mixture and that this solvent mixture has the peculiarly favorable capacity of holding enough d-ribose in solution to ensure a rapid reaction while at the same time solubilizing the nitroxylidine. The importance of this will be appreciated when it is realized that a rapid reaction is necessary to prevent darkening due to decomposition with a consequent reduction in the quality of the product. Since nitroxylidine is only sparingly soluble in alcohol, the solubilizing effect of benzene renders the whole procedure of new and valuable character and enables me in a simple, relatively inexpensive manner to produce the product in the first instance in a very pure state.

My new procedure essentially comprises heating a mixture of d-ribose, 2-nitro-4,5-dimethylaniline, an acid catalyst, alcohol and benzene, while removing vaporized alcohol, benzene and water and while adding benzene to the liquid reaction mixture until the concentration of alcohol and water therein falls to a point sufficiently low to cause d-ribose-2-nitro-4,5-dimethylanilide to crystallize out, whereupon this product is isolated and thus recovered for use, e. g., as an intermediate in the preparation of riboflavin.

In accordance with my invention, d-ribose-2-nitro-4,5-dimethylanilide can be obtained directly from the reaction mixture in a practically pure form not ordinarily requiring any further purification. Should it be desired, however, to obtain a product of exceptional purity the product may be further purified by recrystallization in known manner, but I wish to point out that recrystallization is unnecessary when the product is to be employed as an intermediate in the manufacture of riboflavin, and therefore said recrystallization does not constitute a restriction upon the invention.

It will be appreciated from what has preceded and also from the subjoined examples wherein I have described my invention in greater detail, that my present invention is characterized by the fact that a unique alcohol-benzene solvent combination is employed, that a relatively simple procedure can be employed and that a pure product can be produced in the first instance directly from the reaction mixture.

*Example I*

A suspension of 3 grams of d-ribose, 9 grams of 2-nitro-4,5-dimethylaniline and 0.25 gram of ammonium chloride in 40 cc. of absolute alcohol and 20 cc. of benzene is refluxed on a steam bath for a period of time sufficient to produce a clear solution. This generally requires a minimum of about fifteen minutes. The mixture is then distilled slowly while dropping in a mixture of 50 cc. each of absolute alcohol and benzene. After 100 cc. of distillate has been collected distillation is stopped and the reaction mixture is refluxed for about fifteen minutes. Then distillation is resumed while adding a mixture of 50 cc. each of absolute alcohol and benzene. After 100 cc. of distillate has been collected distillation is again discontinued and the mixture is refluxed for about fifteen minutes. Then the mixture is distilled while benzene is added, until distillation is no longer possible due to bumping caused by separation of a solid reaction product. The reaction mixture is cooled, filtered and the solid product washed with benzene, and then with water and dried. The yield of d-ribose-2-nitro-4,5-dimethylanilide thus obtained is 4.8 grams or 80%. The tri-acetyl derivative, M. P. 161-161.5° C. is obtained in the usual manner in an almost quantitative yield.

Example II

Nine grams of 2-nitro-4,5-dimethylaniline, 0.25 gram of ammonium chloride and 5 grams of a sirup containing 3 grams of d-ribose are dissolved in a mixture of 50 cc. of absolute alcohol and 25 cc. of benzene by refluxing the whole for approximately ten minutes on a steam bath. Then the reaction mixture is distilled while dropping thereinto a mixture of 100 cc. each of absolute alcohol and benzene. When 200 cc. of distillate has been collected distillation is discontinued and the mixture is refluxed for about fifteen minutes. Then distillation is resumed, while adding a mixture of 100 cc. each of absolute alcohol and benzene. After 200 cc. of distillate has been collected distillation is stopped and the reaction mixture is refluxed for about fifteen minutes. Then distillation is resumed, while dropping benzene into the reaction mixture. When bumping due to the separation of solids becomes pronounced distillation and addition of benzene are stopped, and the reaction mixture is cooled and filtered. The filter cake is washed with benzene, and then with water and dried, thereby yielding 4.5 grams (75%) of d-ribose-2-nitro-4,5-dimethylanilide.

Instead of alternately refluxing and distilling as in the foregoing examples the process may also be carried out in the following manner:

The mixture of d-ribose, 2-nitro-4,5-dimethyl-aniline, acid catalyst such as ammonium chloride, alcohol and benzene is slowly distilled through a good fractionating column while running alcohol and benzene into the reaction mixture through separate funnels. The addition of alcohol is stopped when the distillate no longer gives a substantial test for water with anhydrous copper sulfate. The fractional distillation and the addition of benzene, however, are continued until enough alcohol has been removed from the reaction mixture, so that the product deposits or separates from the still hot reaction mixture. After cooling the reaction mixture the product is collected, for instance as described above.

Instead of using ammonium chloride as the acid catalyst in the above condensation various other substances having an acid reaction can be equally well employed such as ammonium bromide, a trace of hydrochloric acid or a hydrohalide of an organic amine.

What I claim as my invention is:

1. A progress for preparing d-ribose-2-nitro-4,5-dimethylanilide which comprises heating a mixture of d-ribose, 2-nitro-4,5-dimethylaniline, an acid catalyst, alcohol and benzene while removing vaporized alcohol, benzene and water and while adding benzene to the liquid reaction mixture, until the concentration of alcohol and water in said reaction mixture drops to the point where d-ribose-2-nitro-4,5-dimethylanilide crystallizes out, and isolating the d-ribose-2-nitro-4,5-dimethylanilide thus obtained.

2. A process for preparing d-ribose-2-nitro-4,5-dimethylanilide which comprises heating by refluxing a mixture of d-ribose, 2-nitro-4,5-dimethylaniline, ammonium chloride, alcohol and benzene while removing vaporized alcohol, benzene and water, and while adding benzene to the liquid reaction mixture, until the concentration of alcohol and water in said reaction mixture drops to the point where d-ribose-2-nitro-4,5-dimethylanilide deposits as a crystalline solid and collecting the d-ribose-2-nitro-4,5-dimethylanilide thus obtained from the reaction mixture.

3. In a procedure for the preparation of d-ribose-2-nitro-4,5-dimethylanilide by reacting d-ribose with 2-nitro-4,5-dimethylaniline in contact with an acid catalyst, the step of effecting the reaction of such reactants in an alcohol-benzene solvent mixture.

4. In a procedure for the preparation of d-ribose-2-nitro-4,5-dimethylanilide by reacting d-ribose with 2-nitro-4,5-dimethylaniline in contact with an acid catalyst, the step which comprises carrying out the said reaction in an alcohol-benzene solvent mixture, thereby enabling the reaction to be carried out at a rapid rate without decomposition and while solubilizing the 2-nitro-4,5-dimethylaniline.

5. A process for producing d-ribose-2-nitro-4,5-dimethylanilide which comprises refluxing d-ribose, 2-nitro-4,5-dimethylaniline, ammonium chloride, alcohol and benzene, for a period of time sufficient to produce a clear solution, alternately refluxing and distilling the above mixture while adding a mixture of equal parts of alcohol and benzene until the distillate is substantially anhydrous, and thereafter adding benzene while continuing the distillation until a solid reaction product separates out and isolating such solid reaction product.

6. A process for producing d-ribose-2-nitro-4,5-dimethylanilide, which comprises heating a mixture of d-ribose, 2-nitro-4,5 dimethylaniline, ammonium chloride, absolute alcohol and benzene, distilling the reaction mixture thus produced while adding a mixture of equal parts of absolute alcohol and benzene, heating the resulting mixture, alternately repeating the distillation and the heating until during a subsequent distillation a solid product separates out and isolating such solid product.

7. A process for producing d-ribose-2-nitro-4,5-dimethylanilide which comprises forming a mixture of d-ribose, 2-nitro-4,5-dimethylaniline, an acid catalyst, alcohol and benzene, distilling the same slowly through a fractionating column while separately adding alcohol and benzene to the said mixture, discontinuing alcohol additions when the distillate is anhydrous and continuing the fractional distillation and the benzene additions until sufficient alcohol has been removed to cause a solid product to be deposited from the hot reaction mixture.

ALEXANDER R. SURREY.